126,557

UNITED STATES PATENT OFFICE.

JOHN G. LUNZ, OF CHICAGO, ILLINOIS.

IMPROVEMENT IN PROCESSES OF PRESERVING GRATED HORSE-RADISH.

Specification forming part of Letters Patent No. 126,557, dated May 7, 1872.

*To whom it may concern:*

Be it known that I, JOHN G. LUNZ, of Chicago, in the county of Cook and State of Illinois, have invented a new and useful Process for Preserving Grated Horse-Radish; and I do declare that the following is a true and accurate description thereof.

This invention relates to an improved process for preparing and bottling grated horse-radish as a condiment for the table, which, if its strength and flavor are to be retained, should not be subjected to the action of heat, as in the usual method of putting up in bottles or jars for keeping other vegetables or fruit.

My process is essentially as follows: Into a basin or other receptacle fitted with a drain-cock at the bottom, I place any convenient quantity of cold vinegar, and slowly add the grated horse-radish until the mass is thick, but yet covered with the vinegar in which it floats, stirring it slowly, which frees the air contained in the mass, rising in a scum to the top, which should be skimmed off. The mass should now be allowed to stand a few minutes in order to allow as much as possible of the air to be freed. I then draw off the vinegar from the bottom, leaving the mass quite stiff. In the bottles which are to be filled I fill in a thin mixture of the grated horse-radish and vinegar—about two-thirds full—and as soon as the foam or scum has risen, indicating the liberation of the contained air, I insert a wooden stick, which carries off the scum by overflowing the bottle. I then withdraw the stick and fill the bottle with the thick mass, being careful not to introduce more air, after which the bottle may be sealed hermetically, with a certainty that its contents will be preserved, without losing their strength, flavor, or color, for a long time.

What I claim as new, and desire to secure by Letters Patent, is—

The process for preserving grated horse-radish in a fresh state, substantially as herein described.

JOHN G. LUNZ.

Witnesses:
WM. H. LOTZ,
EMILE WAGNER.